United States Patent
Peura (10) Patent No.: US 6,550,594 B1
(45) Date of Patent: Apr. 22, 2003

(54) ACTIVE PIN SLOT INDEX SYSTEM FOR A BIDIRECTIONAL CLUTCH

(75) Inventor: Brent Peura, Farmington, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 296 days.

(21) Appl. No.: 09/703,557

(22) Filed: Nov. 1, 2000

(51) Int. Cl.[7] .................................................. F16D 11/06
(52) U.S. Cl. ........................ 192/44; 192/35; 192/84.6; 192/84.7; 192/93 A
(58) Field of Search ............................ 192/44, 38, 35, 192/47, 40, 84.6, 84.7, 93 R, 93 A (56) References Cited

U.S. PATENT DOCUMENTS

| | | | | |
|---|---|---|---|---|
| 3,788,435 A | * | 1/1974 | Preuter ................... | 192/114 R |
| 4,030,581 A | * | 6/1977 | Giometti .................... | 192/16 |
| 4,230,211 A | * | 10/1980 | Goto et al. ................... | 192/35 |
| 4,296,848 A | * | 10/1981 | Kagata et al. ................. | 192/35 |
| 5,348,126 A | * | 9/1994 | Gao ......................... | 192/223.2 |
| 5,547,054 A | * | 8/1996 | Gratzer ....................... | 192/35 |
| 5,549,187 A | * | 8/1996 | Kofler .................... | 192/103 R |
| 5,732,807 A | * | 3/1998 | Itoh et al. ..................... | 192/37 |
| 6,041,879 A | * | 3/2000 | Itoh et al. .................... | 180/247 |
| 6,123,183 A | * | 9/2000 | Ito et al. ..................... | 192/220 |
| 6,244,403 B1 | * | 6/2001 | Ito et al. ...................... | 192/35 |

\* cited by examiner

Primary Examiner—Saul Rodriguez
(74) Attorney, Agent, or Firm—Mick A. Nylander (57) ABSTRACT

An active bidirectional clutch for use on a vehicle includes an oil housing. The clutch also includes a flange rotatably supported with respect to the oil housing. The flange includes an input shaft that is rotatably fixed with respect to the flange and a coupling that is adjacent to the input shaft. The clutch also includes a plurality of rollers in contact with the input shaft and coupling. The clutch uses a roller cage that positions the plurality of rollers with respect to the input shaft and the coupling. The bidirectional clutch also includes a sleeve positioned around the input shaft, wherein the sleeve has a plurality of slots and the sleeve engages the roller cage.

16 Claims, 5 Drawing Sheets

*Figure - 7*

ACTIVE PIN SLOT INDEX SYSTEM FOR A BIDIRECTIONAL CLUTCH

TECHNICAL FIELD

The present invention relates to clutches, and more particularly, relates to an active bidirectional overrunning clutch.

BACKGROUND ART

The use of clutches in an all wheel drive vehicle system has been known for years. In a typical all wheel drive system, the front axle is a primary drive, while torque to the rear axle is only transferred when the front wheels spin faster than the rear wheels. The torque transfer generally occurs if the front wheels have excessive slip and it also can occur during low speed cornering situations and the like. The use of a clutch in an all wheel drive vehicle system works as a mechanical disconnect which prevents torque from being transferred from the rear axle to the front axle. Prior art clutches currently include single direction clutches, bidirectional overrunning clutches, and even clutches that use hydraulic systems to effect changes thereon. The bidirectional overrunning clutch differs from the single directional, in that it works in both the clock wise and counter clock wise rotational directions. During operation of the bidirectional clutch, if the output of the rear axle is rotating faster in one direction than the input from the front axle due to a gear ratio offset, there is no torque transmission, but if the input speed is equal to the output speed the unit will lock. Furthermore, if the bidirectional clutch is used in an all wheel drive system and is in four wheel drive while in the reverse gear, the overrunning clutch locking function direction must be changed from the forward direction to the reverse direction. The bidirectional clutch will switch the operation mode dependent upon the prop shaft or input speed direction. The use of the bidirectional overrunning clutch provides benefits with regards to braking, stability, handling, and drive line durability.

In the typical ABS braking event disconnecting the front and rear drive lines during braking assists in maintaining braking stability. During ABS braking events the locking of the rear wheels is avoided for stability reasons and hence the brake systems are designed to lock the front wheels first. Thus, any torque transfer during an ABS event from the rear axle to the front axle may disturb the braking system because of the potential for instabilities on the slippery road surfaces. The use of the bidirectional overrunning clutch decouples the rear drive once the rear wheels spin faster than the front wheels and provides excellent braking stability.

A bidirectional clutch also reduces the likelihood of throttle off over steering during cornering of the vehicle. During a throttle off maneuver the clutch decouples the rear drive line thus forcing all of the engine braking torque to the front wheels which reduces the possibility of a lateral slip on the rear axle. This condition forces the vehicle to under steer on a throttle off condition, a situation which is considered easier to manage by the average vehicle operator.

The use of bidirectional clutches with an all wheel drive system provides several advantages. However, difficulties sometimes occur during low speed operation when a vehicle is in a reverse rolling position and the vehicle operator selects a drive position. Once the operator accelerates a back lash occurs in the drive line which allows inertia in the engine and other components to build thus transmitting a torque to the rear drive line which may induce an NVH (noise vibration harshness) phenomenon within the bidirectional mechanism as the vehicle drive line moves from the reverse gear to a forward gear. This NVH phenomenon is undesirable in current new vehicle markets. Therefore, there is a need in the art for a bidirectional clutch mechanism that has active indexing which will reduce the NVH phenomenon associated with a switch from a forward to reverse gear and a reverse to forward gear in an all wheel drive vehicle system.

SUMMARY OF THE INVENTION

One object of the present invention is to provide an active bidirectional overrunning clutch capable of being indexed.

Another object of the present invention is to provide an active pin and slot indexing system for use with a bidirectional overrunning clutch.

Yet a further object of the present invention is to provide a clutch with an active indexing that will reduce the NVH phenomenon associated with prior art bidirectional clutch mechanisms.

Still another object of the present invention is to provide a clutch that will index during rotation reversal before torque is transmitted through a prop shaft of the vehicle.

Yet a further object of the present invention is to provide a bidirectional clutch that can be set in a neutral position and will completely disconnect the clutch and allow the rear axle to spin freely, thus operating similar to a part time on demand system.

To achieve the forgoing objects the active bidirectional clutch includes an oil housing. The clutch also includes a flange which is rotatably supported with respect to the oil housing. The clutch also includes an input shaft which is rotatably fixed with respect to the flange. A coupling is located adjacent to the input shaft. The clutch includes a plurality of rollers in contact with the input shaft and the coupling. A roller cage will position the plurality of rollers with respect to the input shaft and the coupling. The clutch also includes a sleeve which is positioned around the input shaft, wherein the sleeve has a plurality of slots. The sleeve is also connected to the roller cage.

One advantage of the present invention is that active indexing of the bidirectional clutch will occur prior to torque transfer.

A further advantage of the present invention is a reduction of the NVH phenomenon by actively indexing the bidirectional clutch mechanism.

A still further advantage of the present invention is the reduction in speed difference between the prop shaft and the rear axle pinion shaft because of the indexing of the clutch, which therefore locks the clutch before any torque transmission.

Yet another advantage of the present invention is the use of a neutral position which will disconnect the clutch from the drive train and let the rear axle spin freely thus acting like a part-time on demand system.

Still another advantage of the present invention is the low speed indexing of the clutch from either the reverse to the forward gear or vice versa.

Other objects, features, and advantages of the present invention will become apparent from the subsequent description and appended claims taken in conjunction with the accompanying drawings.

DESCRIPTION OF THE PREFERRED EMBODIMENT(S)

Figure 1:
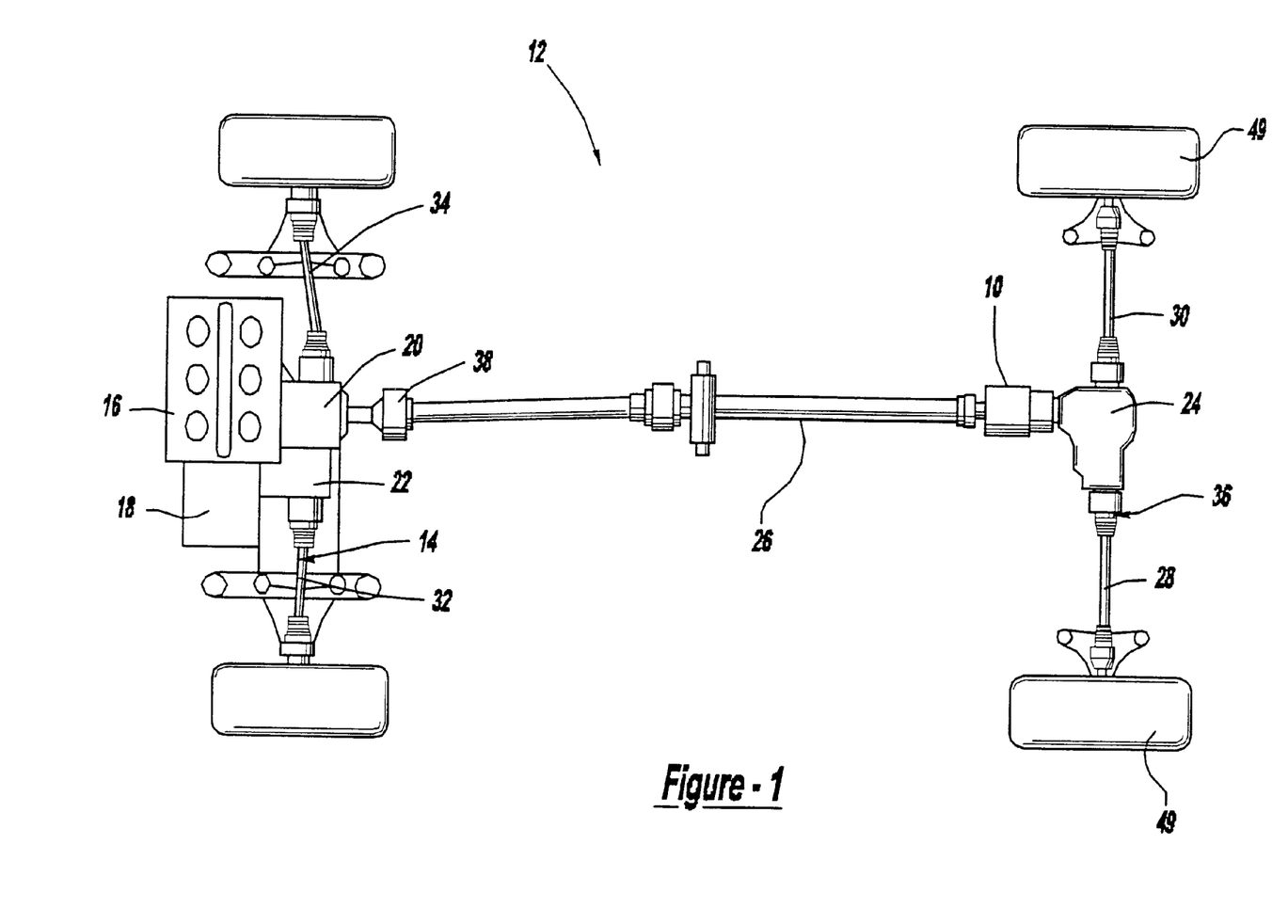
FIG. 1 shows a plan view of a vehicle drive line.

Referring to the drawings, an active bidirectional overrunning clutch 10, according to the present invention, is shown. FIG. 1 schematically illustrates an all wheel drive or four wheel drive motor vehicle 12. The vehicle 12 primarily is a front wheel driven vehicle, however, the present invention can be used on a primary rear wheel driven vehicle as well.

The motor vehicle 12 as shown in FIG. 1 is primarily driven by a front axle 14. The motor vehicle 12 is an all wheel drive or four wheel drive vehicle and is driven by power transferred from the engine 16 through a transaxle or a gear box 18, which may be an automatic or manual gear box, and to the front differential 22 and finally on through to the power take off 20 of the drive train assembly. In an on demand all wheel drive vehicle, power is delivered to the rear differential 24 via a propeller shaft or driving shaft 26, when there is a need for it. At the rear differential 24 power is split to a left hand rear side shaft 28 and a right hand rear side shaft 30 for distribution to the wheels at the rear of the vehicle. The front differential 22 transmits power to the left hand side shaft 32 and the right hand front side shaft 34. An on demand all wheel drive vehicle distributes power to both the rear differential 24 and the front differential 22 via a distributing drive. In an all wheel drive vehicle you have the front axle 14 or the rear axle 36 as a primary driven axle with the other axle only receiving most of the power upon demand or when needed. The preferred embodiment of the present invention is an all wheel drive vehicle wherein an active bidirectional overrunning clutch 10 is located within or near the rear differential 24 and acts from there to distribute torque to the rear axle 36 of the vehicle during front wheel spin conditions. However, it should be noted that a primary driven rear axle vehicle may also be used with the active bidirectional overrunning clutch 10 installed at or near the front differential of such a vehicle.

Figure 2:
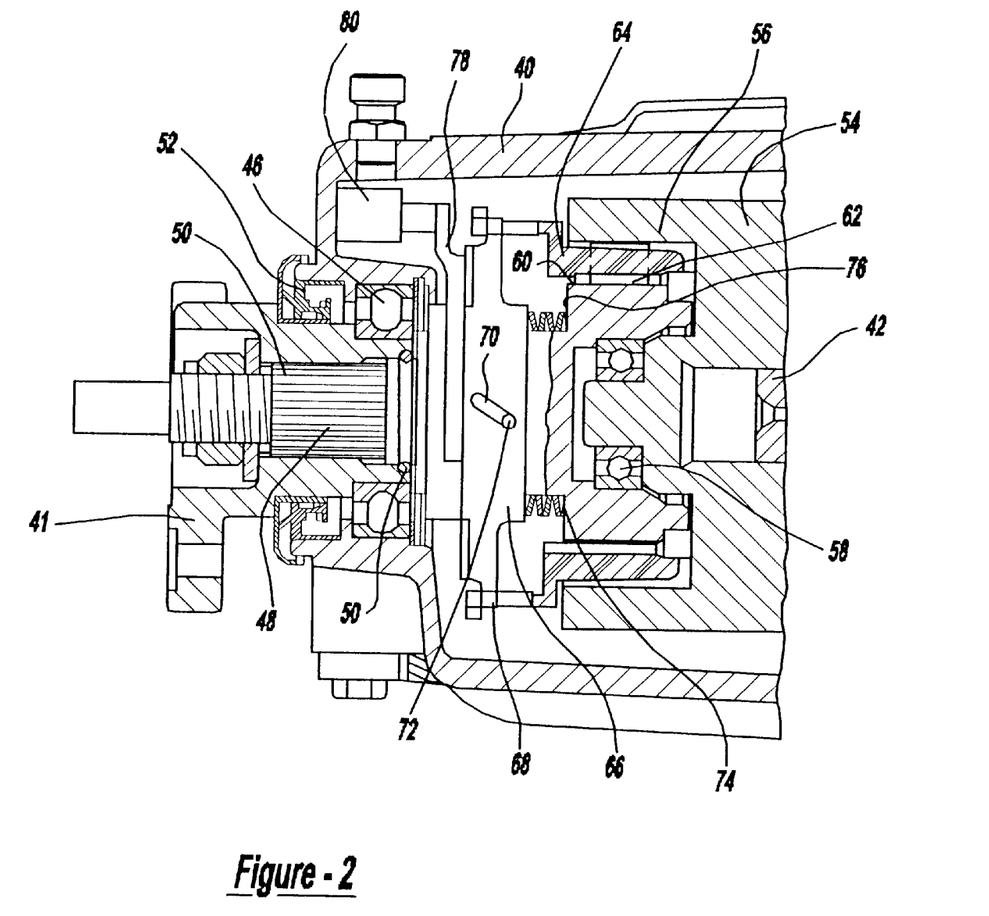
FIG. 2 shows a cross section of the present invention.

The drive train of the vehicle 12 shown in FIG. 1 includes a propeller shaft or drive shaft 26 which transmits power from a power take-off unit 20 to the joint 38 and to the rear differential 24. The rear differential 24 includes an axle or oil housing 40 which includes a bidirectional overrunning clutch 10 therein and a differential housing, which is rotatably supported about a rotational axis as shown in FIG. 2. The differential housing is driven by a vehicle gear box via a driving gear. The bidirectional overrunning clutch 10 connects to the differential housing via a rear pinion shaft 42 and transmits torque to the rear axle 36 when the front axle 14 or front wheels are in a spin or slip condition. The bidirectional overrunning clutch 10 can also be set into a neutral position which completely disconnects the bidirectional overrunning clutch 10 and allows the rear axle 36 to spin freely thus acting and delivering power similar to a part-time on demand drive train system. When the operator selects first a forward gear and then selects a reverse gear or the vice-versa, i.e., a reverse gear was selected and then a forward gear selected, the bidirectional overrunning clutches of prior art often created an NVH phenomenon. This occurs when the rotation of the clutch is changed abruptly from a counter clock wise direction to a clock wise direction or from a clock wise direction to a counter clock wise direction. This NVH phenomenon is sometimes noticeable to operators of the vehicle and is reported as being undesirable.

Figure 3:
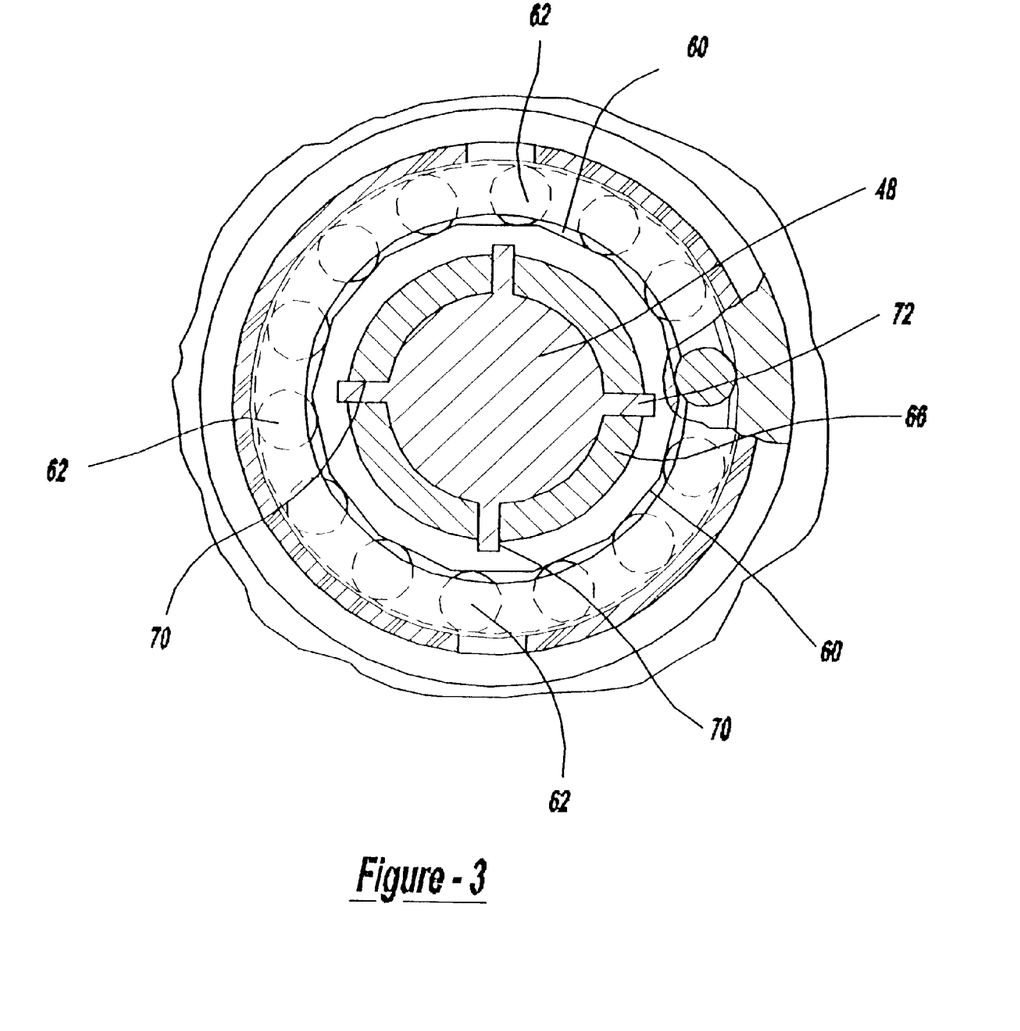
FIG. 3 shows a partial cross section of the present invention.

FIGS. 2 and 3 show cross sections of the active bidirectional overrunning clutch 10. The clutch 10 is located in an oil housing 40. The oil housing 40 is connected to a rear differential 24 and then the rear axle 36 and side shafts (28, 30) and finally to the wheels 49. A flange 44 is connected to the prop shaft 26 which is connected on the opposite end to the power takeoff unit 20. The flange 44 is rotatingly supported within the oil housing 40 by bearings 46. Located within the flange 44 is the input shaft 48 which is connected to the prop shaft 26 via the flange 44. The input shaft 48 is secured within the flange 44 via a plurality of teeth 50 that interact with the input shaft 48 and the surface of the flange 44. A seal 52 is used as a medium between the input shaft 48 and the flange 44. The input shaft 48 of the bidirectional overrunning clutch 10 rotates at the speed the prop shaft 26 is receiving from the front differential 22 in either a clock wise or counter clock wise direction depending on the movement direction of the vehicle. At one end of the input shaft 48 is a coupling 54. It should be noted that in the preferred embodiment the coupling 54 is a viscous coupling 54 but that any other type of coupling may be used or any other type of speed dependent active clutch mechanism. The viscous coupling 54 is integrated with a bidirectional overrunning clutch outer race 56. The outer race 56 output is transmitted to and through the rear axle pinion shaft 42. The viscous coupling 54 will smooth the transition between the speed of the input shaft 48 and the speed going to the rear axle 36. The viscous coupling 54 contacts a second bearing 58 which also contacts an inner surface of the input shaft 48.

The end of the input shaft 48 near the coupling 54 has a plurality of flat surfaces (cam surfaces) or flats 60. The flat surfaces 60 are on the outer circumference of the input shaft 48. A plurality of rollers 62 are in contact with both the flat surfaces 60 of the input shaft and a surface of the outer race 56. The rollers 62 are held in position on each flat surface 60 by a roller cage 64 which extends in an area between the outer race surface 56 and the input shaft flat surfaces 60. The roller cage 64 also extends outwardly from the viscous coupling outer race 56 towards the opposite end of the input shaft 48. The rollers 62 are free to rotate in either direction, i.e., clock wise or counter clock wise, with respect to the roller cage 64. This allows the rollers 62 to rotate from one end of the flat surface 60 of the input shaft to the other end of the flat surface 60 of the input shaft. Each and every roller 62 on each and every flat surface 60 around the entire circumference of the input shaft 48 has this range of motion.

A sleeve 66 surrounds the input shaft 48 in such a way that it is capable of axial movement along the input shaft 48 at a location near the flat surfaces 60 and adjacent to the top end of the roller cage 64. The sleeve 66 includes a ring like protrusion, or ring shoulder 68, that engages the roller cage 64. The sleeve 66 also includes a plurality of slots 70 which have a predetermined angle with respect to the axis of the input shaft 48. The angle of the slots 70 can be altered depending on the characteristics needed for the bidirectional clutch 10. The input shaft 48 also includes a plurality of pins 72 which extend in a radial direction from the input shaft surface. The radial pins 72 are located such that they interact and slide within the slots 70 on the sleeve 66. The pins 72 move along the entire length of the slot 70 with minimal frictional resistance. With the slot 70 set at an angle with respect to the axis of the input shaft any axial movement by the sleeve 66 on the input shaft 48 also causes a rotation of the sleeve 66 at the same time because of the angle of the slot 70 on the sleeve outer surface with respect to axis of the input shaft 48. This angular motion or rotational motion will in turn rotate the roller cage 64 in either the clock wise or counter clock wise direction depending on the direction of the axial movement and the starting position of the sleeve 70. This rotational movement of the roller cage 64 via the sleeve member 66 will move the rollers 62 to predetermined positions on the flat surfaces 60 of the input shaft. In the preferred embodiment there are at least three preferred positions: one corresponding to a forward gear of the motor vehicle, a second corresponding to a reverse gear of the motor vehicle and a third corresponding to a neutral position for the bidirectional clutch 10. The positions correspond to being on the left most side of the flat surface 60, the right most side of the flat surface 60 and in the center position of the flat surface 60, respectively. A spring 74 is located between a surface of the sleeve member 66 and a shoulder member 76 on the input shaft 48 to bias the sleeve member 66 towards the forward position of the sleeve member 66 and rollers 62 on the flat surfaces 60.

Figure 4:
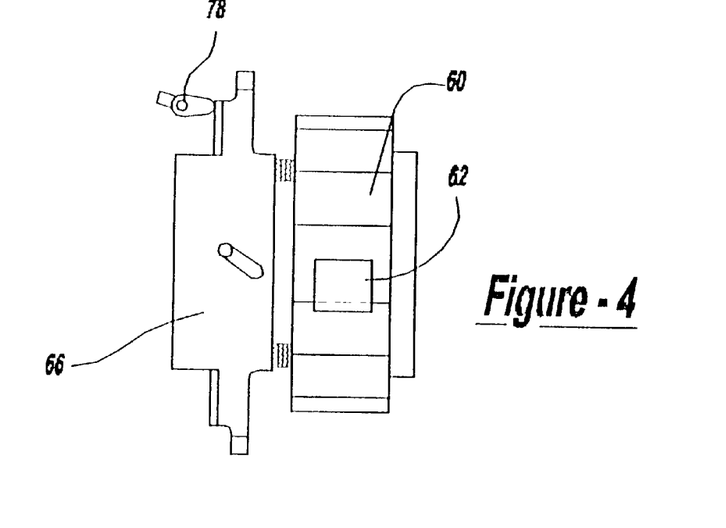
FIG. 4 shows a side view of the sleeve according to the present invention.

In contact with the sleeve 66 on the side opposite of the spring 74 is an arm member 78. In the preferred embodiment the arm member 78 is a cam, see FIG. 4, however, it should be noted that an alternative embodiment has the arm member 78 as a shift fork member. The shift fork member 78 transfers the necessary force to move the sleeve 66 in an axial direction along the input shaft 48. A motor 80 is positioned inside or outside the oil housing 40 such that it is grounded to the oil housing 40. In the preferred embodiment the motor 80 is an electric motor, but any other type of actuator may also be used depending on the needs and requirements of the specific device. The motor 80 is connected to either the end of the shift fork 78 or the cam by standard well-known mechanical means. The motor 80 provides the necessary force to create the axial movement in the sleeve 66 via either the rotating cam or the shift fork member 78. The motor 80 is electronically connected to a vehicle on-board computer or the transmission monitoring computer or any other type of sensor in the vehicle which determines the gear (forward/reverse) the vehicle is in and the previous gear and if there has been a switch in gears in a short time frame. It should be noted that all of the above parts are generally made of a metal material but that any other type of composite, hard plastic may be used depending in the weight requirements and design needs of the automotive manufacturers.

The bidirectional overrunning clutch 10 locks and transmits power to the rear wheels only during a slip condition of the front wheels on a primary driven front wheel drive vehicle. During normal driving conditions of the all wheel drive vehicle, the bidirectional overrunning clutch 10 has the input shaft 48, which is directly connected to the front axle 14 via the prop shaft 26, and the outer race or rear axle 36 running at different speeds due to different gear ratios. The outer race 56 which is connected to the rear axle tends to spin faster than the input shaft 48. While the bidirectional overrunning clutch 10 is at these conditions the sleeve 66 will be biased by the spring 74 towards the forward position which corresponds to the rollers 62 being at the left side (see FIG. 7) position of the flat 60. When the rollers 62 are at the forward position of the flats 60 they are spinning in a clockwise direction in the same direction as the outer race rear axle and no torque is being transferred. However, during a front wheel slip condition, in the forward direction, the prop shaft 26 and rear axle pinion shaft 42 develop a difference in speed that will decrease to zero when the speeds equal each other and then the input shaft 48 will become a driving member, thus compressing the rollers 62 against the outer race of the coupling 54. This will lock the input shaft 48 with the outer race 56 and transmit torque to the housing of the viscous coupling which in turn transmits torque to the rear axle pinion 42. The rollers will be pinched during this locked condition and will stay engaged until a torque reversal, i.e., no front wheel slip occurs.

The roller cage 64 will position the rollers 62 on the input shaft flat surfaces 60 during low and high speed overrun and during initial lock-up of the bidirectional overrunning clutch 10. The roller cage 64 is rotating at all times at the input shaft speed. The rollers 62 are always in constant contact with the outer race 56 during any speed. This contact tends to spin the rollers 62 as well as create a drag force on the roller. During overrun conditions, the outer race 56 is rotating faster than the input shaft 48 thus the direct force of the roller 62 as well as the outer race 56 rotating at a higher angular velocity forces the rollers 62 to transverse from one side of the flat to the other. During low speeds, the sleeve will counter act the drag effect which will avoid excessive grounding during any change of direction, i.e., reverse to forward to vice versa of the vehicle. The direction change will affect the rotation of the prop shaft 26. The rollers 62 will have to be indexed from the left side to the right side of the flat surfaces of the input shaft 48 by the pin/slot system on the sleeve 66, via the roller cage 64, to reduce engagement abruptness which occurs if the rollers 62 are not indexed and the rollers 62 are suddenly, via a significant amount of torque, forced to the opposite side of the flat surfaces.

Figure 5:
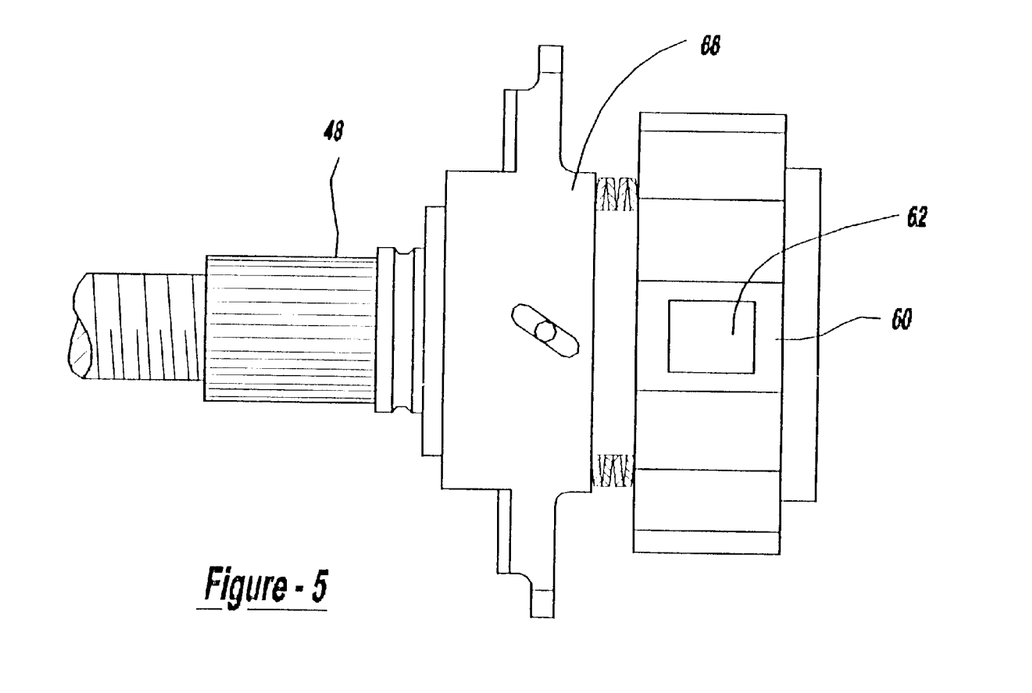
FIG. 5 shows a side view of the present invention in a neutral position.
Figure 6:
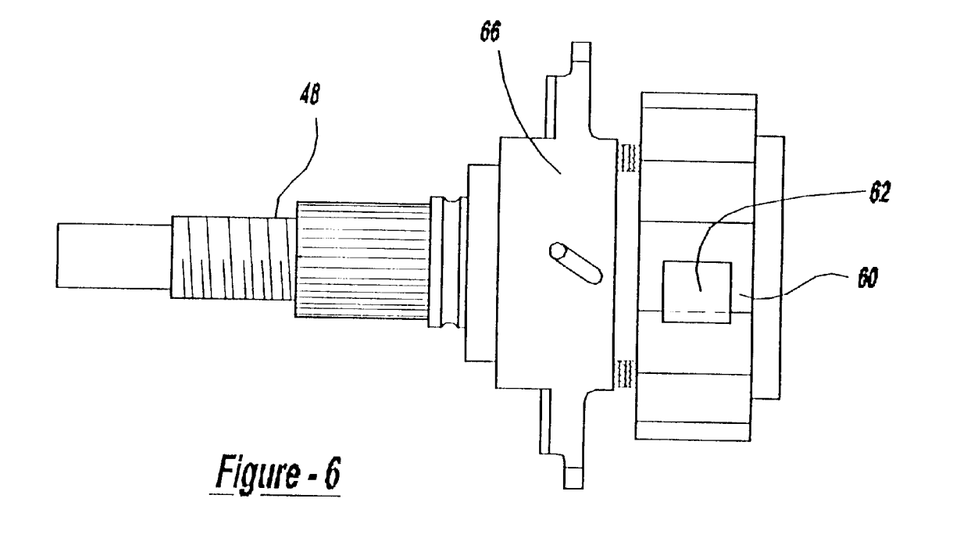
FIG. 6 shows a side view of the present invention in a forward position.
Figure 7:
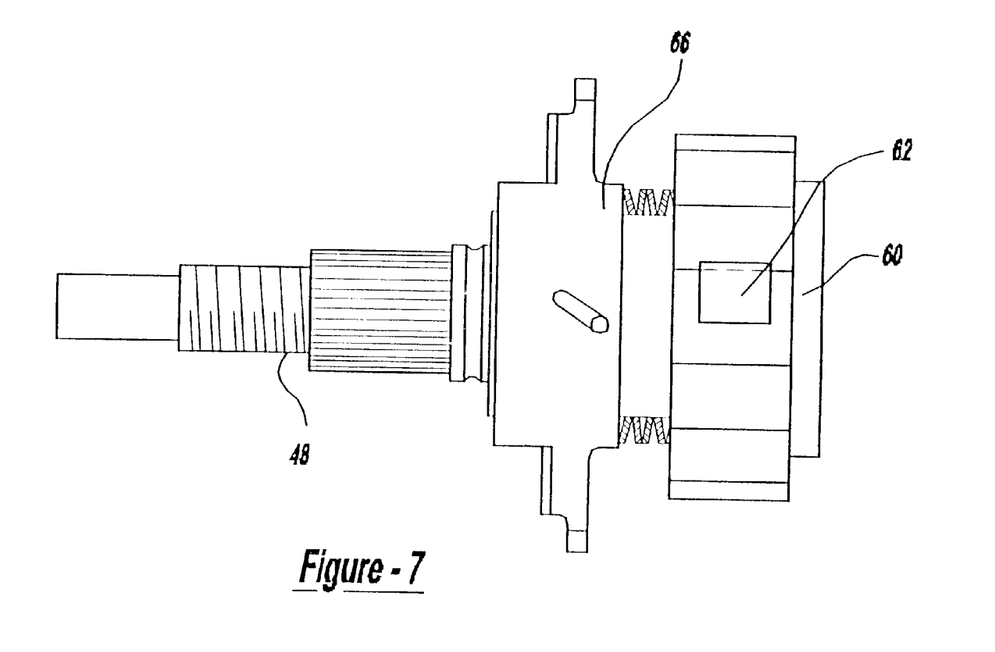
FIG. 7 shows a side view of the present invention in a reverse position.

FIG. 5 shows the sleeve 66 as arranged on the input shaft 48 with the roller 62 in the neutral position, i.e., the roller 62 at the center of the flat surface 60. FIG. 6 shows the input shaft 48 with the sleeve 66 at a reverse gear position and the roller 62 at the far right side of the shaft flat surface 60. FIG. 7 shows the input shaft 48 with the sleeve 66 in the forward gear position indexing the roller 62 to the far left side of the flat surface 60 prior to transmission of torque in the forward direction.

In operation, active indexing of the bidirectional overrun clutch 10 will be used to reduce the NVH phenomenon found in prior art bidirectional clutch mechanisms. The NVH effect tends to occur at low speeds after a shift from a forward gear to a reverse gear or the opposite, reverse gear to a forward drive gear. Indexing the bidirectional clutch 10 will occur during rotation reversal before any torque is transmitted through the prop shaft 26 to the viscous coupling 54 and on through to the rear axle 36. The motor 80 is in contact with the arm member 78 which is then connected to the sleeve 66. In the preferred embodiment the motor 80 is an electronic motor and is connected electrically to the transmission controller of the vehicle operating computer. However, it should be noted that the motor can be connected to any of the vehicle on-board computers or sensors in the vehicle. The electric motor 80 is controlled by the use of simple computer logic programming. This programming adds a circuit that allows the electric motor 80 to index the rollers 62 from one side of the input shaft flat surfaces 60 to a second side of the input shaft flat surfaces 60 at a predetermined time. It should be noted that if the motor 80 has been off for a predetermined amount of time the spring 74 will bias the sleeve 66 back to the neutral or forward position of the pin index system. The motor 80 will remain on a predetermined time interval such as approximately two minutes depending on a number of factors such as the speed of the spinning front wheels, etc. When the rollers 62 are indexed or moved before any torque transfer, no back lash will occur in the bidirectional overrunning clutch 10. This will also allow the speed difference across the bidirectional overrunning clutch 10 to be reduced thus lessening or eliminating the NVH phenomenon.

If the operator of the vehicle selects a drive or forward gear after being in reverse gear, the computer logic will first determine which type of gear, reverse and not forward, was selected and then send a signal to the motor 80 to index the rollers 62, to the reverse side of the flat surfaces of the input shaft 48. This all occurs during the transmission and engine lag. Therefore, the rollers 62 move to the forward side of the flat surfaces of the input shaft 48 before any torque transmission is applied to the viscous coupling 54 and then on to the rear axle 36. In the preferred embodiment the motor 80 will be turned on for a period of two minutes and then turned off after the two minute interval has passed. It should be noted that any other time interval from a few seconds to many minutes may be used depending on factors and environmental conditions of the drive train system. The transmission and engine will have a lag when the front wheels incur a spin condition thus delaying the transmission of torque for a predetermined time. Hence, the motor will be left on ensuring indexing of the rollers 62. Therefore, even if the vehicle is rolling in the reverse direction and the operator selects a drive forward gear, and then accelerates, the electric motor upon receiving electronic signal that a forward drive gear was selected will index the rollers 62 for a period of two minutes thus reducing any backlash or NVH phenomenon in the drive line. This occurs even though the inertia of the engine and the transmission have built up, however the rollers 62 will have been indexed before any torque is transmitted. This reduction of the backlash of the rear drive line system will allow for a less speed difference between the input prop shaft and the rear axle pinion shaft and will ensure that the bidirectional overrunning clutch is locked before any torque transmission occurs.

It should be noted that the motor 80 actives the cam or shift fork 78 by use of a solenoid that responds to a signal from the on-board automotive computers. The pin/slot device system will allow activation of the roller clutch both in the clock wise and counter clock wise directions. When the pin/slot roller indexing system is in the neutral or no torque position the vehicle is well equipped for situations such as towing or spare tire usage in case of a flat. This neutral position will prevent any torque from being transferred through the clutch 10 to the rear axle and rear wheels.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A bidirectional clutch, comprising:
    an oil housing;
    a flange rotatably supported with respect to said oil housing;
    an input shaft rotatably fixed with respect to said flange;
    a plurality of alignment pins, said alignment pins extending from said input shaft,
    a coupling adjacent to said input shaft;
    a plurality of rollers in contact with said input shaft and said coupling;
    a roller cage, said roller cage positions said plurality of rollers with respect to said input shaft and said coupling; and
    a sleeve positioned around said input shaft, said sleeve having a plurality of slots, wherein said sleeve engages said roller cage and said alignment pins slide within said slots and rotate said sleeve in a clockwise or counter clock wise direction.

2. The bidirectional clutch of claim 1 wherein said sleeve rotation indexes said roller cage and said rollers.

3. The bidirectional clutch of claim 2 wherein said input shaft includes a plurality of flat surfaces on one end thereof.

4. The bidirectional clutch of claim 3 wherein said indexing positions said rollers on a first side of said flat surface.

5. The bidirectional clutch of claim 3 wherein said indexing positions said rollers on a second side of said flat surface.

6. The bidirectional clutch of claim 3 wherein said indexing positions said rollers on a middle position on said flat surface.

7. The bidirectional clutch of claim 6 wherein said middle position ensures the clutch is in a disconnect mode.

8. The bidirectional clutch of claim 2 wherein said indexing occurs before torque transmission by the clutch.

9. The bidirectional clutch of claim 2 wherein backlash in the clutch is reduced by indexing of said rollers.

10. The bidirectional clutch of claim 7 further including a spring, said spring biases said sleeve to said middle position.

11. A clutch for use on a vehicle, the vehicle having a prop shaft between a rear axle and a front axle, said clutch comprising:
    a flange;
    an input shaft fixed with respect to said flange, said input shaft having a plurality of flat surfaces, said input shaft having a plurality of pins extending radially therefrom;
    a coupling adjacent to said input shaft on one side thereof, said coupling rotatably fixed to a pinion shaft of the rear axle;
    a plurality of rollers in contact with said flat surfaces and said coupling;
    a roller cage, said roller cage positions said plurality of rollers to a predetermined location on said plurality of flat surfaces;
    a sleeve around said input shaft, said sleeve having a plurality of slots, said plurality of pins extend through said plurality of slots, said pins slide within said slots to rotate said sleeve in a clockwise or counter clock wise direction, said sleeve engages said roller cage and indexes said roller cage and said rollers; and
    a motor, said motor creates a force that axially moves said sleeve.

12. The clutch of claim 11 further including a shift fork located between said motor and said sleeve.

13. The clutch of claim 11 further including a cam located between said motor and said sleeve.

14. The clutch of claim 11 wherein said indexing occurs before any torque transmission by the clutch.

15. The clutch of claimr 11 further including a spring, said spring biases said sleeve to a neutral position.

16. An active bidirectional overrunning clutch for use in a vehicle with an all wheel drive train system having a prop shaft connecting a front axle and a rear axle, said active bidirectional overrunning clutch comprising:

a housing;

a flange rotatably supported in said housing;

an input shaft rotatably fixed with respect to said flange, said input shaft having a plurality of flat surfaces on an outside circumference thereof, said input shaft having at least one pin extending radially therefrom.

a viscous coupling adjacent to said input shaft near said flat surfaces, said viscous coupling defined in part by an outer race on one end thereof, said viscous coupling rotatably fixed with respect to a pinion shaft of the rear axle;

a plurality of rollers contacting said outer race and said flat surfaces, said rollers move along said flat surfaces;

a roller cage, said roller cage positions said plurality of rollers to a predetermined location in said plurality of flat surfaces;

a sleeve around said input shaft, said sleeve having a plurality of slots, said slots are arranged at a predetermined angle with respect to an axis of said input shaft, said pins extend through said slots and slide within said slots; said sleeve engages said roller cage and rotates said roller cage in a counter clock wise or clockwise direction;

an arm member in contact with said sleeve, said arm member moves said sleeve in an axial direction; and a motor attached to said housing, said motor engages said arm in response to a signal, said motor will ensure said rollers are indexed to a predetermined location on said flat surfaces before any torque transmission occurs within the clutch.

* * * * *